US00RE46325E

(19) United States
(12) Reissued Patent
Swayne et al.

(10) Patent Number: US RE46,325 E
(45) Date of Reissued Patent: *Feb. 28, 2017

(54) LED-BASED DENTAL EXAM LAMP WITH VARIABLE CHROMATICITY

(71) Applicant: Kavo Dental Technologies, LLC, Charlotte, NC (US)

(72) Inventors: Jamie Swayne, Lake Zurich, IL (US); H. Thomas Lockamy, Monroe, NC (US); Nabil Dagher, Charlotte, NC (US); Wei Li, South Barrington, IL (US); Joe Bria, Waxhaw, NC (US); Robert St. Louis, Charlotte, NC (US); John Helgesen, Rock Hill, SC (US); Ted Von Badinski, Indian Trail, NC (US); Tom Benfeld, York, SC (US); Austin Unsworth, Fort Mill, SC (US); Nathan Hemmer, Newberg, OR (US); Jason W. Spencer, Charlotte, NC (US); Daniel B. Manglicmot, Pineville, NC (US)

(73) Assignee: Kavo Dental Technologies, LLC, Charlotte, NC (US)

( * ) Notice: This patent is subject to a terminal disclaimer.

(21) Appl. No.: 14/639,335

(22) Filed: Mar. 5, 2015

Related U.S. Patent Documents

Reissue of:
(64) Patent No.: 8,388,205
Issued: Mar. 5, 2013
Appl. No.: 13/231,221
Filed: Sep. 13, 2011

U.S. Applications:
(63) Continuation of application No. 12/287,481, filed on Oct. 8, 2008, now Pat. No. 8,016,470, which is a
(Continued)

(51) Int. Cl.
*F21V 7/00* (2006.01)
*F21S 8/00* (2006.01)
(Continued)

(52) U.S. Cl.
CPC ..... *F21V 13/04* (2013.01); *F21W 2131/202* (2013.01)

(58) Field of Classification Search
CPC ..... F21V 13/04; F21W 2131/202
(Continued)

(56) References Cited

U.S. PATENT DOCUMENTS 4,608,622 A 8/1986 Gonser
5,908,294 A * 6/1999 Schick et al. ..... 433/29
(Continued)

FOREIGN PATENT DOCUMENTS

DE 102006004995 A1 10/2006
EP 1019970 7/2000
(Continued)

OTHER PUBLICATIONS

Walsh, Laurence J., LED operating lights in dental practice, Australasian Dental Practice, May/Jun. 2009, pp. 48-54.

*Primary Examiner* — James Menefee
(74) *Attorney, Agent, or Firm* — Michael Best & Friedrich LLP

(57) ABSTRACT

An electrically powered light source including a light emitting diode (LED) having variable chromaticity, which is adapted for use in a dental operatory. A dental operatory lamp includes a thermally conductive housing having a front directed toward the operating area and a rear away from the operating area; a generally elliptical reflector located on the rear of the thermally conductive housing; at least one heat pipe; a plurality of color LEDs projecting light toward the elliptical reflector, the plurality of LEDs being in thermal contact with the at least one heat pipe; and an optical light guide for combining light from said LEDs. Another embodiment of the lamp includes at least two user selectable light spectra, one of said spectra providing white light with color
(Continued)

temperature in the range 4000° K-6000° K and one spectra having reduced output in the wavelength range 400-500 nm.

59 Claims, 7 Drawing Sheets

Related U.S. Application Data continuation-in-part of application No. 11/867,876, filed on Oct. 5, 2007, now abandoned, which is a continuation-in-part of application No. 11/120,170, filed on May 2, 2005, now Pat. No. 7,425,077.

(51) Int. Cl.
*F21V 13/04* (2006.01)
*F21W 131/202* (2006.01)

(58) Field of Classification Search
USPC ..... 362/573, 804
See application file for complete search history.

(56) References Cited

U.S. PATENT DOCUMENTS

| | | | | |
|---|---|---|---|---|
| 6,290,368 | B1 | 9/2001 | Lehrer | |
| 6,523,979 | B1 | 2/2003 | Kawata et al. | |
| 6,554,463 | B2 | 4/2003 | Hooker et al. | |
| 6,692,252 | B2 | 2/2004 | Scott | |
| 6,698,907 | B1 | 3/2004 | Alahautala et al. | |
| 6,821,117 | B2 * | 11/2004 | Burtscher et al. | 433/29 |
| 6,955,444 | B2 | 10/2005 | Gupta | |
| 6,991,355 | B1 | 1/2006 | Coushaine et al. | |
| 7,001,057 | B2 | 2/2006 | Plank et al. | |
| 7,101,072 | B2 | 9/2006 | Takada et al. | |
| 7,182,597 | B2 | 2/2007 | Gill et al. | |
| 7,189,983 | B2 | 3/2007 | Aguirre et al. | |
| 7,202,489 | B2 | 4/2007 | Aguirre et al. | |
| 7,202,490 | B2 | 4/2007 | Aguirre et al. | |
| 7,207,694 | B1 * | 4/2007 | Petrick | 362/240 |
| 7,218,824 | B2 | 5/2007 | Franklin et al. | |
| 7,250,611 | B2 | 7/2007 | Aguirre et al. | |
| 7,401,943 | B2 | 7/2008 | Okamitsu et al. | |
| 7,410,283 | B2 | 8/2008 | West et al. | |
| 7,425,077 | B2 * | 9/2008 | Lockamy et al. | 362/33 |
| 7,450,028 | B2 | 11/2008 | De Godzinsky | |
| 7,545,584 | B2 | 6/2009 | Gold et al. | |
| 7,645,056 | B1 | 1/2010 | Mills et al. | |
| 7,658,526 | B2 | 2/2010 | Henson et al. | |
| 7,777,955 | B2 | 8/2010 | Cassarly et al. | |
| 7,850,334 | B2 | 12/2010 | Holder et al. | |
| 7,959,338 | B2 | 6/2011 | Kazakevich | |
| 8,016,470 | B2 | 9/2011 | Li et al. | |
| 8,016,474 | B2 * | 9/2011 | Ha | 362/618 |
| 8,070,322 | B2 * | 12/2011 | Unsworth | 362/285 |
| 8,388,205 | B2 | 3/2013 | Swayne et al. | |
| 2001/0046652 | A1 | 11/2001 | Ostler et al. | |
| 2003/0147258 | A1 | 8/2003 | Fischer et al. | |
| 2003/0185009 | A1 * | 10/2003 | Walters | F21V 23/0442 362/276 |
| 2003/0215766 | A1 | 11/2003 | Fischer et al. | |
| 2004/0029069 | A1 | 2/2004 | Gill et al. | |
| 2004/0043351 | A1 * | 3/2004 | Logan et al. | 433/29 |
| 2004/0149998 | A1 * | 8/2004 | Henson | B60Q 1/0011 257/98 |
| 2004/0264193 | A1 * | 12/2004 | Okumura | F21S 10/02 362/276 |
| 2005/0231945 | A1 * | 10/2005 | Leibinger | H05B 33/0863 362/231 |
| 2006/0002135 | A1 * | 1/2006 | Kokeny et al. | 362/573 |
| 2006/0245173 | A1 | 11/2006 | Lockamy et al. | |
| 2007/0024971 | A1 * | 2/2007 | Cassarly et al. | 359/487 |
| 2007/0031777 | A1 | 2/2007 | Wang et al. | |
| 2008/0002402 | A1 | 1/2008 | Mandikos | |
| 2008/0025013 | A1 | 1/2008 | Lockamy et al. | |
| 2009/0046476 | A1 | 2/2009 | West et al. | |
| 2009/0091913 | A1 | 4/2009 | Li et al. | |

FOREIGN PATENT DOCUMENTS

| | | | |
|---|---|---|---|
| EP | 1260196 | | 11/2002 |
| EP | 1389710 | | 2/2004 |
| EP | 1690302 | | 8/2006 |
| EP | 1767967 | | 3/2007 |
| EP | 1741975 | A2 | 10/2007 |
| JP | 4187414 | B2 | 11/2008 |
| WO | 99/16136 | | 4/1999 |
| WO | 00/35402 | | 6/2000 |
| WO | 0067048 | A2 | 9/2000 |
| WO | 2005/057669 | | 6/2005 |
| WO | 2006/092697 | | 9/2006 |
| WO | 2009/045223 | | 4/2009 |

* cited by examiner

LED-BASED DENTAL EXAM LAMP WITH VARIABLE CHROMATICITY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED U.S. APPLICATION DATA

This application is a *reissue of U.S. patent application Ser. No. 13/231,221, filed Sep. 13, 2011, now U.S. Pat. No. 8,388,205, which is a* continuation of application Ser. No. 12/287,481, filed Oct. 8, 2008, now issued as U.S. Pat. No. 8,016,470, which is a continuation-in-part of application Ser. No. 11/867,876, filed Oct. 5, 2007, now abandoned, which is a continuation-in-part of application Ser. No. 11/120,170, filed May 2, 2005, now issued as U.S. Pat. No. 7,425,077, to which priority is claimed under 35 USC 120. The disclosures of the previously referenced U.S. patent applications are hereby incorporated herein by reference in its entirety.

TECHNICAL FIELD

This invention relates to apparatus that produce visible light. It is particularly directed to an electrically powered light source including a light emitting diode (LED) having variable chromaticity, which is adapted for use in a dental operatory.

BACKGROUND

It has been known for an extended period of time that electricity may be harnessed to create visible light. Incandescent light emitting elements powered by electricity have been used for substantially the same period of time. However, such incandescent lights suffer from an inefficient conversion of electricity to visible light. The inefficient conversion process causes production of a considerable amount of heat, and emission of a significant amount of radiation in, or near, the infrared spectrum. Such infrared emission inherently casts a heat load onto a target along with an illuminating beam. The heat generated by incandescent lighting may sometimes place an undesirable burden on environmental control systems, such as cooling systems used in dwellings. Both the inefficient conversion process, and removing the undesired heat load from the area near the light, lead to a correspondingly larger than necessary electric utility bill. Furthermore, in use on an operatory to illuminate an operating site on a patient, the infrared emissions may undesirably dry illuminated tissue, or may produce a feeling of discomfort in the patient.

Alternative light emitting elements include fluorescent light bulbs. Such fluorescent bulbs advantageously produce a reduced heat load compared to incandescent bulbs. However, fluorescent bulbs tend to be bulky, and generally produce light of a less desirable color and intensity for many applications. Furthermore, certain electrical components required in the electric circuit powering the fluorescent bulbs, such as the ballast, tend to produce an undesirable amount of noise. In use in an operatory, it is generally desired to reduce the bulk of a lamp fixture, to reduce its intrusion into the operating arena, and to facilitate ease of manipulation of the lamp fixture.

The majority of currently marketed dental exam lights use incandescent bulbs as light sources. These incandescent dental exam lights possess a number of disadvantages, such as: emission of infra-red (IR) radiation that must be removed with filters or so-called 'cold-mirrors' to prevent excessive warming of the patient and user; relatively short bulb lifetime; inability of the user to adjust light color temperature and chromaticity of light; color temperature becoming lower and the light becoming "warmer" (i.e., shifting from white to orange/red), when light intensity is reduced (dimmed); and production of significant ultraviolet (UV) and blue light which causes undesired and uncontrolled curing of dental composites and adhesives.

It would be an improvement to provide a more energy-efficient lamp fixture capable of producing a reduced heat load, and casting illumination having a desirable color and intensity that can be adjusted to obtain desirable spectra in a single lamp.

BRIEF SUMMARY OF THE INVENTION

A particular embodiment of the invention includes a dental operatory lamp used to illuminate an operating area which comprises a thermally conductive housing having a front directed toward the operating area and a rear away from the operating area; a generally elliptical reflector located on the rear of the thermally conductive housing; at least one heat pipe; a plurality of color LEDs projecting light toward the elliptical reflector, the plurality of LEDs being in thermal contact with the at least one heat pipe; and an optical light guide for combining light from said LEDs.

Another embodiment of the invention is drawn to a dental operatory lamp used to illuminate an operating area that includes: a plurality of color LEDs; an optical light guide for combining light from said LEDs; and at least two user selectable light spectra, one of said spectra providing white light with color temperature in the range 4000° K-6000° K and one spectra having reduced output in the wavelength range 400-500 nm.

Yet another embodiment of the invention relates to a dental operatory lamp used to illuminate an operating area that includes: a housing having a front directed toward the operating area and a rear away from the operating area; a reflector module located at the rear of the housing; a plurality of color light emitting diodes (LEDs) on the reflector module; and an optical light guide configured to direct the light from the color LEDs toward the front of the lamp in a pattern that focuses white light from the lamp to a central area of illumination of high intensity, with significantly reduced intensity illumination outside the central area.

BRIEF DESCRIPTION OF THE SEVERAL VIEWS OF THE DRAWINGS

While the specification concludes with claims particularly pointing out and distinctly claiming that which is regarded as the present invention, this invention can be more readily understood and appreciated by one of ordinary skill in the art from the following description of the invention when read in conjunction with the accompanying drawings in which:

DETAILED DESCRIPTION OF THE INVENTION

Although the foregoing description contains many specifics, these should not be construed as limiting the scope of the present invention, but merely as providing illustrations of some representative embodiments. Similarly, other embodiments of the invention may be devised that do not depart from the spirit or scope of the present invention. Features from different embodiments may be employed in combination.

Figure 1:
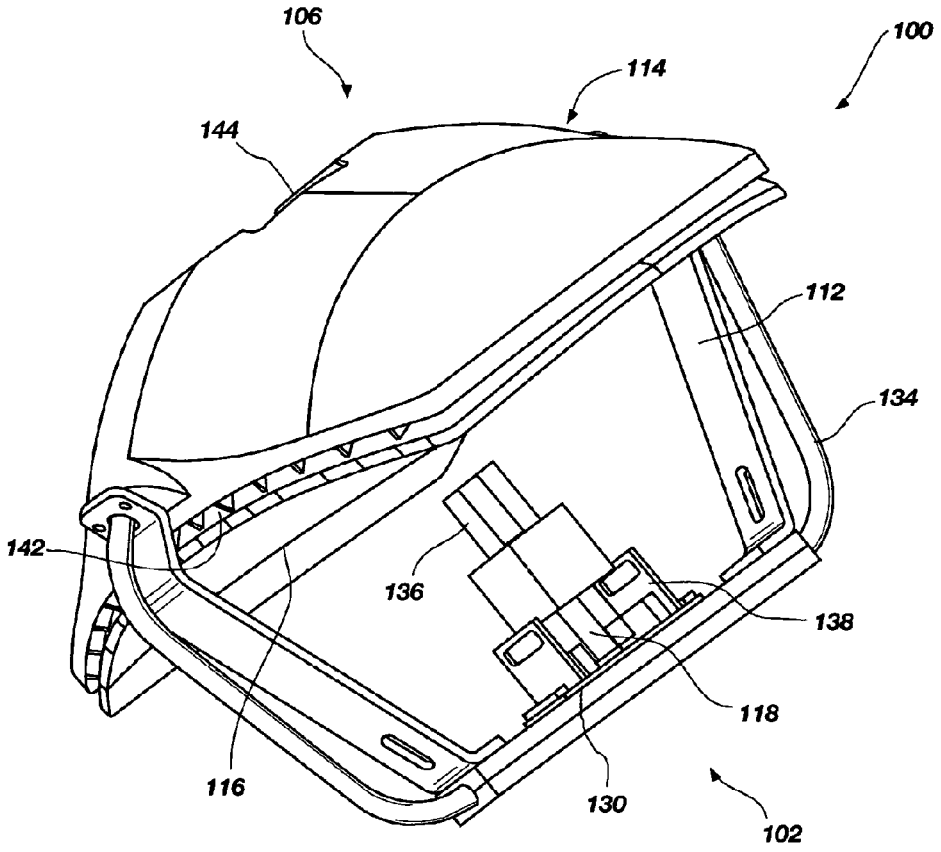
FIG. 1 is a perspective view of a dental operatory lamp according to a particular embodiment of the invention.

FIG. 1 illustrates a perspective view of a current embodiment of the invention, generally indicated at 100, of a light source structure constructed according to principles of the invention. Light source structure 100 may generally be characterized as a lamp. Lamp 100 is powered by electricity, and functions to provide illumination to a work area disposed a distance from the lamp front, generally indicated at 102. Desirably, the work area illuminated by lamp 100 is shadow-free, and appears relatively uniform in illumination color and intensity. For most applications, the illuminated target work area is considered to have an approximately flat footprint and a depth normal to that footprint. That is, the illuminated region is generally structured to encompass a volume disposed proximate the footprint.

Illustrated lamp 100 can include an attachment structure (not shown) operable to connect lamp 100 to suspension structure in the work area. Such an attachment structure is typically attached at a back 106 of lamp 100, although any convenient arrangement is operable. Typical suspension structure in a dental operatory permits a user to orient the lamp in space operably to aim the light output of lamp 100 at the desired target area. Certain embodiments of the invention provide a lamp having reduced weight and/or intrusive volume compared to commercially available lamps. Such reduced weight lamps permit a corresponding reduction in mass of the lamp suspension arrangement, thereby increasing ease of manipulation of the lamp to orient its output toward a target.

In use in an environment such as a dental operatory, a front shield (not shown) can be provided as a protective cover to block migration of dust and contaminated aerosols into the lamp interior. A front surface of such a shield may be structured to provide an easily cleanable surface, whereby to maintain sterility of the operatory area. In certain embodiments, the shield may incorporate one or more lenses to focus, or otherwise modify, the light output of lamp 100. Whether or not a focusing lens is provided, a shield made from Lexan®, or other similar optically useful and formable material, can be provided to completely encase the front of a dental lamp to resist contamination of, and to facilitate cleaning of, the lamp. The shield may be injection molded and may include focusing lenses. Desirably, the shield, or a portion of lamp housing 114, can be hinged, or otherwise openable by a user, to provide access to the interior of lamp 100 for maintenance or replacement of a light generating element.

Figure 2:
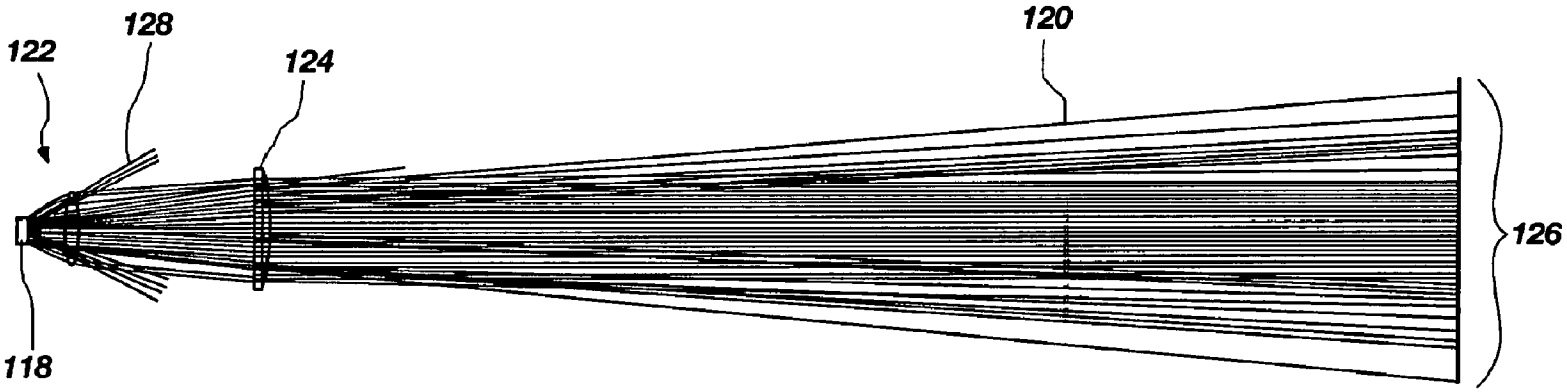
FIG. 2 illustrates a component arrangement and a representative LED light output in a dental operatory lamp.

With reference to FIG. 2, an LED 118 emits light indicated by a plurality of rays 120. An operable LED can include a 3 watt LED, such as that sold by Lumileds Lighting US, LLC under the Brand name Luxeon, part number LXHL-LW3C.

Typically, a reflective element, generally indicated at 116, is provided to direct the LED's light output toward a target. In a particular embodiment, reflective element 116 can be a concave aspheric reflector which collects the light emanating from the mixing rod and focuses it onto the plane of the patient's face ("image plane"). The reflector surface contour can be a simple 2D ellipse section revolved around the central optical axis. A focusing lens 122 may be included in an arrangement effective to collimate rays 120 and further direct them to an illuminated area indicated at 126. In certain embodiments of the invention, area 126 corresponds to the target footprint of the lamp 100. In such case, it is desired that the illumination emitted from each module 108 is substantially uniform over area 126. Certain rays 128 may be emitted in a direction other than desired for impingement on area 126. Such rays 128 are characterized as stray light. As indicated by the illustrated collection of rays 120, area 126 sometimes has a higher intensity of illumination at its center, and may fade to a decreased intensity near its perimeter, as discussed with reference to FIG. 4. In another embodiment, the LED 118, mirror 122, and all associated optics are arranged in harmony to produce a substantially uniform intensity over its illuminated footprint at a selected focal distance.

LEDs 118 are typically mounted onto a bracket 112 associated with lamp housing 114. Desirably, the bracket 112 assembly is structured to provide simple and rapid installation and removal of LED 118, and includes connection structure for the electricity supplied to the LED and may further include a metal core circuit board 130. It is further desirable for bracket 112 to be formed from a material capable of conducting heat or, alternatively, to be associated with heat conducting pipes 134. Advantageously, bracket 112 and/or heat pipe 134, together with housing 132 may be structured and arranged to dissipate any heat generated by LED 118 in a direction away from the front 102 of the lamp 100. In some embodiments, use of heat pipe 134 is particularly desirable since a large heat sink positioned directly behind the metal core board with the heat-generating LEDs may significantly obscure the light focusing onto the image plane. Through use of a heat pipe 134 or equivalent structure, the heat can be conducted away via heat pipes 134 to a heat sink housing positioned on the back of the reflector where it does not obscure the light. An exemplary heat sink housing can include heat sink fins 142. The heat sink fins 142 can be integral with the outer housing of the lamp and constructed of any heat conducting or dissipating material, such as cast aluminum. To increase cooling, a fan can be used to draw air into a gap 144 between the reflector and the heat sink housing. To maximize surface area and thus cooling, the inside of the heat sink/housing includes fins or ribs 142 that form air channels therebetween.

Figure 3:
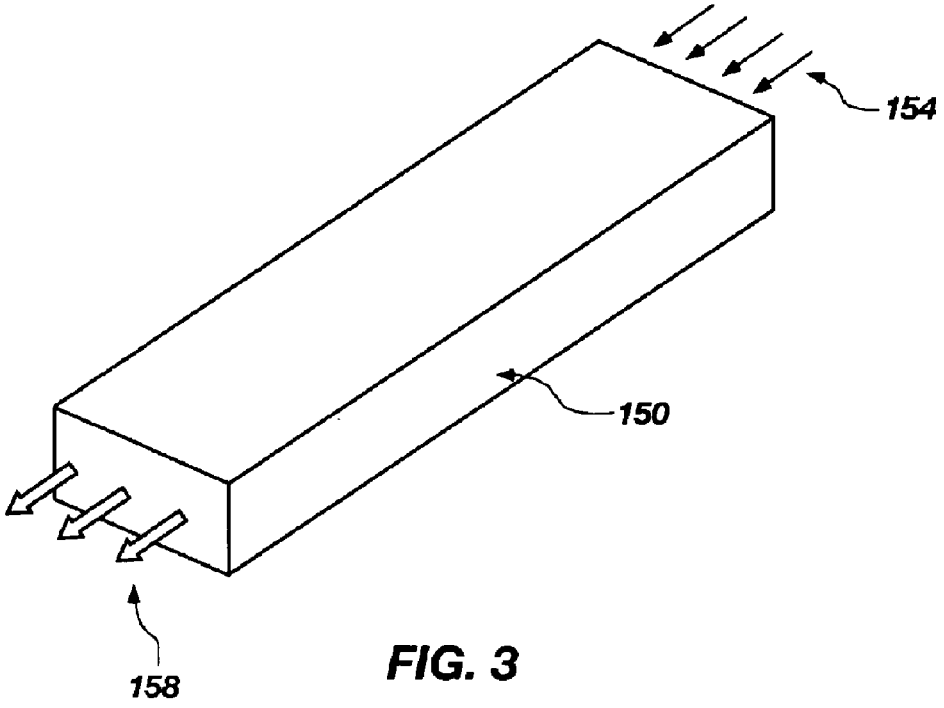
FIG. 3 illustrates an embodiment of an optical light guide in a dental operatory lamp of the invention.

In order to produce homogenous light from multiple LEDs of different colors (for example, red, greed, blue, and amber), the light emitting from each individual LED should sufficiently overlap the light from all the other LEDs. In a particular embodiment, a clear rectangular rod made of acrylic serves this function and is referred to herein as an optical light guide or a light mixing rod 136. It is understood that the mixing rod 136 can be made out of any suitable material capable of acting as an optical light guide. The performance of the mixing rod 136 can be significantly enhanced with the addition of periodic features or "ripples" 150 on the outside walls of the mixing rod, as shown in FIGS. 1 and 3. As illustrated in FIG. 3, light from multiple LEDs of different colors 154 (e.g., red, green, blue, and/or amber) are introduced through one end of the mixing rod 136 and emanate from another end of the mixing rod 136 as a composite white light 158. One particular embodiment combines the light from four different colored LEDs (red, blue, green, and amber) to produce white light. By varying the ratios of the different colors, the character of the white light can be changed. Specifically, white light with coordinated color temperatures (CCTs) of 4200° K and 5000° K can be produced while maintaining a high color rendering index (CRI), typically in excess of 75. Blue light typically occurs in the peak wavelength range of 445 nm to 465 nm. Green light typically occurs in the dominant wavelength range of 520 nm to 550 nm, amber light in the range of 584 nm to 597 nm, and red light in the range of 613 nm to 645 nm. A rod support 138 can be used to secure mixing rod 136 in place.

Multiple LEDs of each color can be mounted using reflow surface mount techniques to achieve optimum optical density. In a particular embodiment, a conventional metal core board (MCB) 130 can be used. Alternatively, a conventional fiberglass laminate (FR4) printed circuit board (PCB) material can be used. LEDs, particularly red and amber LEDs, have the characteristic that their light output decreases significantly as their temperature raises. Heat management can be critical to maintaining optimum light output and therefore the proper ratios of light intensity to maintain the desired CCT and CRI.

The lamp 100 of the present invention includes a number of different operating modes which provide different light characteristics, as described in Table 1.

TABLE 1

| | Nominal CCT | | Approximate relative peak intensity | | | | |
|---|---|---|---|---|---|---|---|
| Mode | (° K.) | CRI | Blue | Green | Amber | Red | Comments |
| "Cool white" | 5,000 | 70+ | 0.72 | 0.70 | 0.75 | 1.00 | Meets European user preference for cooler white light. |
| "Warm white" | 4,200 | 70+ | 1.00 | 0.80 | 0.75 | 1.00 | Meets US user preference for warmer white light. |
| "No-cure" | N/A | N/A | ~0 | 0.30 | 0.60 | 1.00 | Greatly reduced flux below 500 nm will not cure dental adhesives. |

In this design, the ratios of the four colors are controlled with a variation of pulsed width modulation of the current. During the assembly and test of the lamp 100, each color is independently characterized for peak wavelength, spectral spread (full width half max), and illuminance (lux) at the image plane at a predetermined maximum current. Using test software based on both theoretical and empirical predictions, these values are used to generate a table of duty cycles for each wavelength at each of the three operating conditions: 4200K, 5000K, and "No guide" modes at start up (board temperature equal to ambient temperature). These tables then can be stored on an electronic memory device (chip) that matches the serial number of the lamp. The PWM controller then looks up the duty cycle table on the memory chip and sets the duty cycles accordingly when the lamp is first started. At this time, the test software algorithm can also produce and store duty cycle tables for the full range of operating board temperatures, as discussed in more detail below.

In a particular embodiment of the invention, temperature compensation or measurement may be included. Since each color LED has a different sensitivity to heat, a compensation algorithm can be used to set the drive current values for each color as a function of temperature. The compensation algorithm may be adapted to assume that LEDs of a given color do not exhibit significant differences in temperature sensitivity. As a result, each lamp need not be characterized thermally but rather may depend on the theoretical and empirically determined temperature relationships in the algorithm. A thermistor on the LED circuit board may also be included to measure actual board temperature from which the LED temperature can be derived, based on previously determined empirical values, and the current to each LED color can be adjusted accordingly by software.

In another embodiment, a dental operatory lamp used to illuminate an operating area comprises a housing having a front directed toward the operating area and a rear away from the operating area, and a reflector module located at the rear of the housing. An electrical power supply is provided for supplying electrical power to the LEDs for illuminating the LEDs, with the power supply being selectively operable to provide an intensity adjustment for the LEDs. The electrical power supply can be selectively operable to control the level of power transmitted to each LED independent of the level of power transmitted to the other LEDs. The lamp can be configured to have a variable color output. For example, the intensity adjustment can range from 0 to about 2500 FC. The intensity adjustment can be continuous throughout its range of adjustments or, alternatively, can be adjustable at discrete settings within its range of adjustments. The lamp may further include a microprocessor in communication with the LEDs to control the level of power transmitted to the LEDs, and thus the output intensity of the light from the lamp. Suitable microprocessors for use with the present invention are well known in the art and include, but are not limited to, any programmable digital electronic component that incorporates the functions of a central processing unit (CPU) on a single semiconducting integrated circuit (IC).

In an alternative embodiment of the invention, a dental operatory lamp used to illuminate an operating area comprises a housing having a front directed toward the operating area and a rear facing away from the operating area. A plurality of light emitting diodes (LEDs) can be included. An adapter configured for receiving at least one non-light emitting diode (non-LED) light source is located within the housing. The at least one non-LED light source may consist of a group of lights that can be selected from, for example, Quartz halogen, tungsten halogen, incandescent, xenon, fluorescent, fiber optics, gas plasma, laser, ultraviolet, and blue light. The at least one non-LED light source may also include the group of lights selected from, for example, dental curing light, oral cancer screening light, decay detection (cavities and caries) blood detection sterilization and tooth whitening light.

Figure 4:
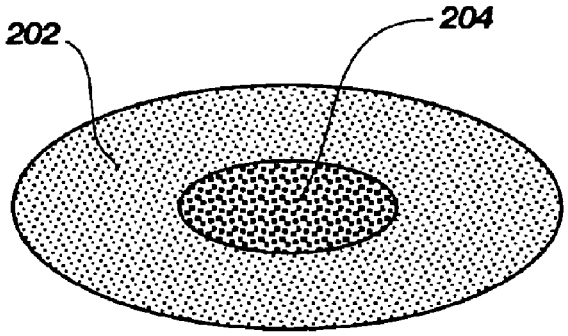
FIG. 4 illustrates a representative illumination pattern for the dental operatory lamp according to one embodiment of the invention; [and]

A particular embodiment of the invention includes a dental operatory lamp used to illuminate an operating area having a housing with a front directed toward the operating area and a rear away from the operating area. The LEDs 118 are positioned with their longitudinal axes aligned toward predetermined points on the reflective element 116 for directing the light from the LEDs 118 toward the front of the lamp in a pattern that focuses light from the lamp to a central area of illumination of high intensity 204, with significantly reduced intensity illumination 202 outside the central area, as shown in FIG. 4. Particular representative patterns of focused light emanating from the dental operatory lamps of the present invention include, for example, a pattern of focused light that can be elliptically shaped and may be about 3 inches by about 6 inches (7.62 cm by about 15.24 cm) in size. In a particular embodiment, the reduced intensity illumination 202 outside the central area of illumination 204 decreases in intensity by 50% of a maximum intensity relative to the central area of illumination of high intensity. The central area of illumination of high intensity 204 can have a pattern size of at least 50 mm by 25 mm. The reduced intensity illumination 202 outside the central area can be configured to decrease in intensity progressively and smoothly relative to the central area of illumination of high intensity. The pattern can be configured to have a brightness of greater than about 20,000 Lux at a focus height of 700 mm from a target. The illumination on the central area of illumination of high intensity 204 at a distance of 60 mm can be configured to be less than about 1200 Lux. Illumination at the maximum level of the dental operating light in the spectral region of 180 nm to 400 nm can be configured to not exceed 0.008 W/m2.

Figure 5:
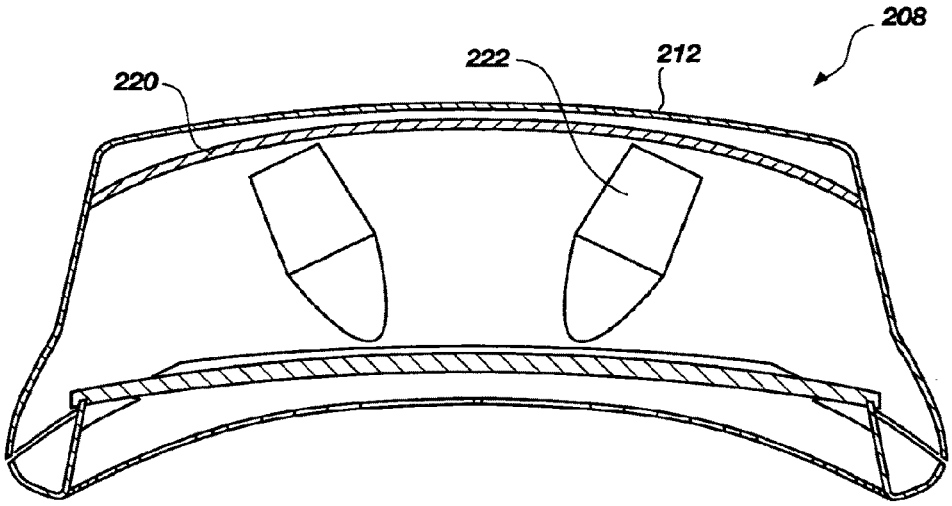
FIG. 5 is a cross-section of a light module having a reflective interior reflective surface according to a particular embodiment of the invention.

Yet another embodiment of the invention is shown in FIG. 5, wherein a dental operatory lamp used to illuminate an operating area includes a lamp assembly 208 having a front 210 directed toward the operating area and a rear 212 away from the operating area. A reflector module 220 can be located within the lamp assembly 208, and more specifically, can be located at the rear 212 of the lamp assembly 208. A plurality of light emitting diodes (LEDs) can optionally be located in a reflector module 222. Optionally, a light mixing rod (not shown) may be included as part of the reflector module 222 to produce homogenous light from the multiple LEDs of different colors. The lamp assembly 208 can include a curved or faceted interior reflective surface 220. The LEDs can be directed toward the curved or faceted interior reflective surface 220 for directing the light from the LEDs toward the front 210 of the lamp in a pattern that focuses light from the lamp to a central area of illumination of high intensity, with significantly reduced intensity illumination outside the central area. The reduced intensity illumination outside the central area can be configured to decrease in intensity by 50% of a maximum intensity relative to the central area of illumination of high intensity. The reduced intensity illumination outside the central area may be configured to decrease in intensity progressively and smoothly relative to the central area of illumination of high intensity. The light pattern can have a brightness of greater than about 20,000 Lux at a focus height of 700 mm from a target. The illumination on the central area of illumination of high intensity at a distance of 60 mm may be less than about 1200 Lux. The illumination at the maximum level of the dental operating light in the spectral region of 180 nm to 400 nm may be configured to not exceed 0.008 W/m$^2$.

The lamp 100 of the present invention allows the user to set various chromaticity settings, such as sunlight equivalent D65 or simulated fluorescent lighting for improved dental shade matching. It also allows the addition of thermal, color, or intensity feedback to better maintain light characteristics over the life of the product, and permits adjustment of light intensity independent of color setting. The lamp 100 also is adapted to provide different configurations and forms of color mixing light guides. Specifically, the lamp 100 provides a user selectable mode with reduced irradiance in the near UV and blue wavelengths to allow adequate illumination while not initiating curing of UV-curable dental composites and adhesives. The lamp design can provide longer life through use of LEDs instead of incandescent bulbs and which can be further achieved through use of heat pipes, finned rear housing and fan cooling which maintain low LED temperature even at high currents.

Figure 6:
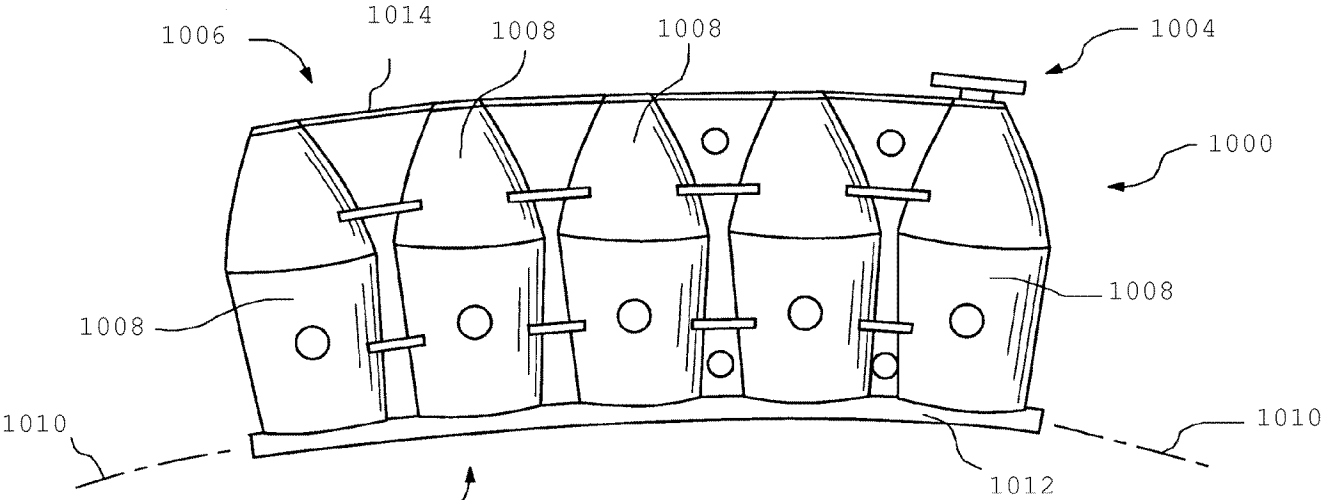
*FIG. 6 is a side view representation of a dental operatory lamp constructed according to principles of the invention;*

*FIG. 6 illustrates a side view of a currently preferred embodiment, generally indicated at 1000, of a light source structure constructed according to principles of the invention. Light source structure 1000 may generally be characterized as a lamp. Lamp 1000 is powered by electricity, and functions to provide illumination to a work area disposed a distance from the lamp front, generally indicated at 1002. Desirably, the work area illuminated by lamp 1000 is shadow-free, and appears relatively uniform in illumination color and intensity. For most applications, the illuminated target work area is considered to have an approximately flat footprint and a depth normal to that footprint. That is, the illuminated region is generally structured to encompass a volume disposed proximate the footprint.*

*Illustrated lamp 1000 includes attachment structure, generally indicated at 1004, operable to connect lamp 1000 to suspension structure in the work area. Illustrated attach structure 1004 is carried at a back 1006 of lamp 1004, although any convenient arrangement is operable. Typical suspension structure in a dental operatory permits a user to orient the lamp in space operably to aim the light output of lamp 1000 at the desired target area. Certain embodiments of the invention provide a lamp having reduced weight and/or intrusive volume compared to commercially available lamps. Such reduced weight lamps permit a corresponding reduction in mass of the lamp suspension arrangement, thereby increasing ease of manipulation of the lamp to orient its output toward a target.*

*Lamp 1000 includes a plurality of light modules 1008 that may be disposed in an array and tilted along an arcuate path 1010 to aim their collective light outputs to impinge on a desired target footprint. Illustrated light modules 1008 are sometimes also called reflective modules. One row of modules 1008 is visible in FIG. 6, although any number of such rows may be repeated in a columnar, staggered, or other arrangement in space to form a 3-dimensional lamp body providing the desired luminescent output.*

*One currently preferred lamp assembly 1000 includes 3 rows forming 5 columns of modules 1008, for a total of 15 modules in the lamp. Such modules 1008 are desirably spaced apart from each other and aimed in harmony to form a shadow-free illumination of a target region. In the context of this disclosure, the term "shadow-free" means that an object, such as a tool or a user's hand, casts essentially no shadow when placed between the lamp and its illuminated target. It is currently preferred for an output of each module to be shaped to substantially illuminate the entire target footprint. Therefore, the target footprint is fully illuminated*

*by the sum of the outputs of modules 1008. In such an arrangement, an object blocking light emitted by one, or even most, of the modules 1008 still would not cast a shadow on the target footprint. A path along a column between rows may be a straight line, although it is currently preferred that such path (not illustrated, but similar to path 1010) also is arcuate.*

*In use in an environment such as a dental operatory, it is preferred to provide a front shield 1012 as a protective cover to block migration of dust and contaminated aerosols into the lamp interior. A front surface of such a shield 1012 may be structured to provide an easily cleanable surface, whereby to maintain sterility of the operatory area. In certain embodiments, shield 1012 may incorporate one or more lenses to focus, or otherwise modify, the light output of lamp 1000. Whether or not a focusing lens is provided, a shield made from LEXAN®, or other similar optically useful and formable material, desirably is provided to completely encase the front of a dental lamp to resist contamination of, and to facilitate cleaning of, the lamp. Illustrated shield 1012 is injection molded, and includes focusing lenses for each of the modules 1008 in a unitary part. Desirably, shield 1012, or a portion of lamp housing 1014, is hinged, or otherwise openable by a user, to provide access to the interior of lamp 1000 for maintenance or replacement of a light generating element.*

Figure 7:
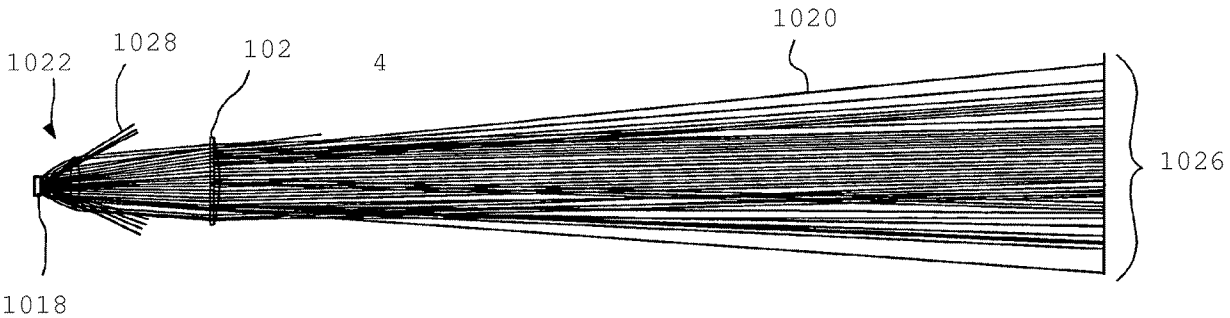
*FIG. 7 illustrates a component arrangement and a corresponding light output for a module;*

*With reference to FIG. 7, an LED 1018 emits light indicated by a plurality of rays 1020. An operable LED includes a 3 watt LED such as that sold by Lumileds Lighting US, LLC under the Brand name Luxeon, part number LXHL-LW3C.*

*Typically, a reflective element, generally indicated at 1022, is provided to direct the LED's light output toward a target. A focusing lens 1024 may be included in an arrangement effective to collimate rays 1020, and further direct them to an illuminated area indicated at 1026. In certain embodiments of the invention, area 1026 corresponds to the target footprint of the lamp 1000. In such case, it is desired that the illumination emitted from each module 1008 is substantially uniform over area 1026. Certain rays 1028 may be emitted in a direction other than desired for impingement on area 1026. Such rays 1028 are characterized as stray light. As indicated by the illustrated collection of rays 1020, area 1026 sometimes has a higher intensity of illumination at its center, and may fade to a decreased intensity near its perimeter. In another embodiment, the LED 1018, mirror 1022, and all associated optics are arranged in harmony to produce a substantially uniform intensity over its illuminated footprint at a selected focal distance.*

Figure 8:
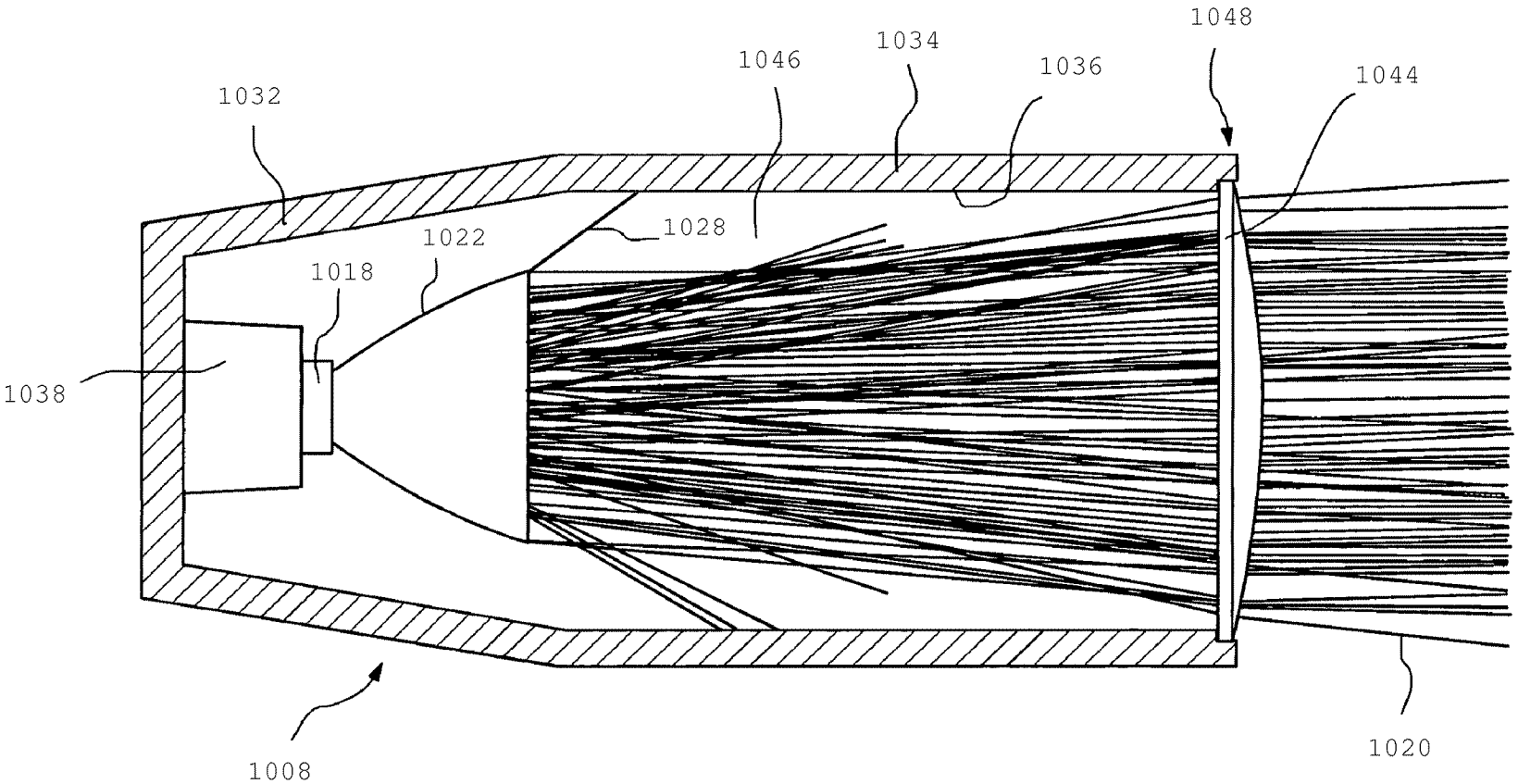
*FIG. 8 is a cross-section taken along an axis of a light module constructed according to principles of the invention;*

*Another exemplary light module 1008 is illustrated in FIG. 8. Housing 1032 of illustrated module 1008 includes a portion that forms a component stray light tube 1034. An interior surface 1036 of tube 1034 may be reflective, but desirably is arranged to resist reflection of incident stray light rays 1028 to reduce emission of such stray rays outside the target footprint. A preferred stray light tube 1034 provides a black, or essentially light absorbing, surface 1036 to resist reflection of stray light rays 1028. It is within contemplation for a stray light tube 1034 to be formed as a distinct component. However, including the stray light tube as a portion of the housing 1032 reduces part count and cost, and simplifies assembly of a lamp 1000.*

*LED 1018 is typically mounted with respect to housing 1032 by a conveniently structured foundation 1038. Desirably, foundation 1038 is structured to provide simple and rapid installation and removal of LED 1018, and includes connection structure for the electricity supplied to the LED. It is further desirable for foundation 1038 to be formed from a material capable of conducting heat. Advantageously, foundation 1038 and housing 1032 may be structured and arranged to dissipate any heat generated by LED 1018 in a direction away from the front of the lamp 1000.*

*Lens 1044 may be arranged to disperse, focus, collimate, color, or otherwise modify a characteristic of light 1020 passing therethrough. Alternatively, or in addition, lens 1044 may be configured as a protective shield for a module 1008, or lamp 1000. In certain cases, a collimating lens may be disposed in the space 1046 located between LED 1018 and a distal end 1048 of module 1008. Desirably, such collimating lens is placed in proximity to the discharge opening of the parabolic reflector 1022 to reduce a length of the light module 1008. In a currently preferred embodiment of lamp 1000, modules 1008 are about 2½ inches in length, and approximate the size in a thickness direction of the lamp 1000.*

Figure 9:
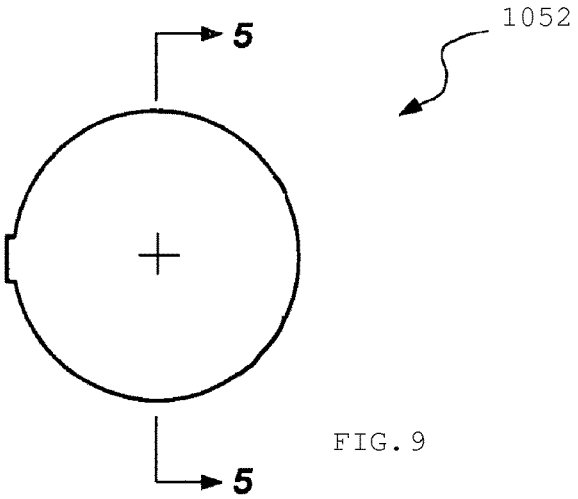
*FIG. 9 is an end view of a first collimating lens used in certain embodiments of the invention;*
Figure 11:
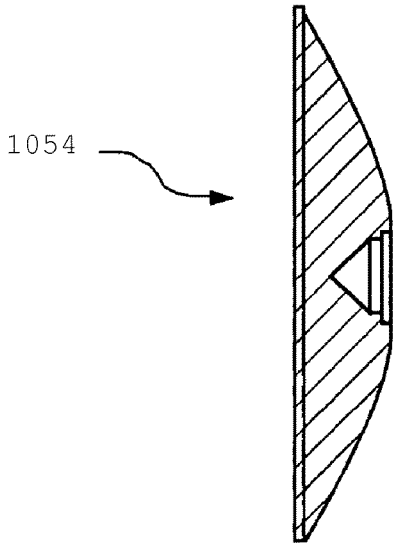
*FIG. 11 is a cross-section, similar to FIG. 10, taken through a second, alternative, collimating lens.*
Figure 10:
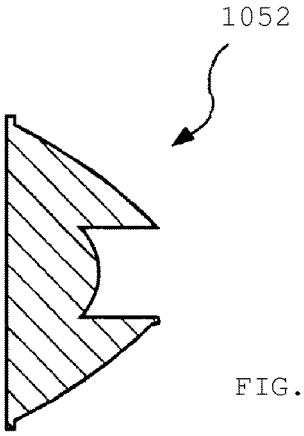
*FIG. 10 is a cross-section taken through section 5-5 in FIG. 9 and looking in the direction of the arrows; and*

*FIGS. 9-11 illustrate configurations of collimating lenses of use in certain embodiments constructed according to principles of the invention. Such lenses typically are structured to direct the LED's light output toward a target, and permit formation of lamp 1000 in a compact form factor. A pair of operable collimating lenses, configured as TIR lenses, is illustrated in FIGS. 9-11. The first collimating TIR lens 1052 (<4.5 deg. FWHM) is illustrated in end and section views in FIGS. 9 and 10, respectively. The second TIR lens (<2 deg. FWHM), illustrated in cross-section in FIG. 11 and is generally indicated at 1054. Such lenses permit a reduction in length of the stray light tube or equivalent portion of a housing 1032.*

Although the foregoing description contains many specifics, these are not to be construed as limiting the scope of the present invention, but merely as providing certain representative embodiments. Similarly, other embodiments of the invention can be devised which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A dental operatory lamp used to illuminate an operating area comprising: a plurality of color LEDs; an optical light guide for combining light from said LEDs; and at least two user selectable light spectra, one of said spectra providing white light with color temperature in the range 4000° K-6000° K and one spectra having reduced output in the wavelength range 400-500 nm.

2. The dental operatory lamp of claim 1, wherein the user selectable light spectra comprises varying ratios of at least three colors emanating from the color LEDs.

3. The dental operatory lamp of claim 1, wherein the user selectable light spectra comprises various ratios of red, blue, green, and amber light emanating from the color LEDs.

4. A dental operatory lamp used to illuminate an operating area comprising: a housing having a front directed toward the operating area and a rear away from the operating area; a reflector module located at the rear of the housing; a plurality of color light emitting diodes (LEDs) on the reflector module; [and] an optical light guide configured to direct the light from the color LEDs toward the front of the lamp in a pattern that focuses white light from the lamp to a central area of illumination of high intensity, with significantly reduced intensity illumination outside the central area; *an attachment structure disposed on the housing; and a suspension structure connected to the attachment structure and arranged to suspend the lamp in a dental operatory.*

5. The dental operatory lamp of claim 4, wherein the optical light guide produces at least three operating modes with different light characteristics.

6. The dental operatory lamp of claim 4, wherein the lamp produces white light with coordinated color temperatures of between 4000° K and 6000° K and maintaining a color rendering index in excess of 75.

7. The dental operatory lamp of claim 4, wherein [the] *a* user selectable light spectra comprises various ratios of red, blue, or green, or amber light emanating from the color LEDs.

8. A dental operatory lamp used to illuminate an operating area comprising: a housing having a front directed toward the operating area and a rear away from the operating area; a reflector module located in the housing; and a plurality of color light emitting diodes (LEDs) on the reflector module, wherein said lamp comprises different operating modes comprising a first operating mode having light characteristics for curing of a dental adhesive and a second operating mode having light characteristics that do not cure the dental adhesive.

9. The dental operatory lamp of claim 8, wherein said first operating mode comprises a cool white mode or a warm white mode.

10. The dental operatory lamp of claim 9, wherein said cool white mode comprises producing a light spectra in the range of 4000-6000 degrees K.

11. The dental operatory lamp of claim 9, wherein said warm white mode comprises producing a light spectra in the range of 4000-6000 degrees K.

12. The dental operatory lamp of claim 9, wherein said cool white mode and warm white mode comprise producing a light spectra with 70 or greater color rendering index.

13. The dental operatory lamp of claim 8, wherein said second operating mode comprises light having flux below 500 nm.

14. The dental operatory lamp of claim 8, further comprising a light guide for combining light from said LEDs.

15. The dental operatory lamp of claim 14, wherein said light guide is configured to direct light from said LEDs toward the front of said housing.

16. The dental operatory lamp of claim 8, wherein said plurality of color LEDs comprises LEDs that emit at least three colors.

17. The dental operatory lamp of claim 16, wherein said at least three colors comprises at least three of blue, green, amber, or red.

18. The dental operatory lamp of claim 17, wherein said at least three colors comprises blue, green, amber, and red.

19. The dental operatory lamp of claim 8, wherein said different operating modes comprise at least two user selectable light spectra, one of said spectra providing white light with color temperature in the range 4000° K-6000° K and one spectra having reduced output in the wavelength range 400-500 nm.

*20. A dental examination lamp comprising:*

*a housing;*

*a plurality of tubes within the housing and arranged in a generally side-by-side configuration, each tube having an interior, a first end, and a second end, the second end open to the transmission of light from the interior of the tube, each tube being absorptive, generally non-reflective, or both absorptive and generally non-reflective;*

*a plurality of light emitting diodes (LEDs), each of the LEDs being arranged to direct light through at least part of one of the tubes and out of the lamp*

*an attachment structure disposed on the housing; and*

*a suspension structure connected to the attachment structure and arranged to suspend the lamp in a dental operatory.*

*21. The lamp of claim 20, wherein the plurality of tubes are positioned with their longitudinal axes aligned to direct light toward predetermined points to form a predetermined light pattern within an examination area.*

*22. The lamp of claim 20, further comprising a plurality of lenses, with at least one lens per tube located proximate to the second end thereof and adapted to direct the light from the plurality of LEDs out of the lamp in a pattern that casts illumination over an examination area.*

*23. The lamp of claim 20, further comprising a lens member at a front of the lamp presenting a plurality of individual lens sections over a face thereof arranged in a pattern corresponding to the position of the plurality of tubes, each lens section being aligned with a respective tube and adapted to direct light from that tube out of the lamp in a pattern that casts illumination over an examination area.*

*24. The lamp of claim 20, further comprising a collimating element arranged to collimate light emanating from an LED.*

*25. The lamp of claim 20, further comprising a lens adapted to color the light directed out of the lamp.*

*26. The lamp of claim 20, wherein an interior surface of at least one of the plurality of tubes is black.*

*27. The lamp of claim 20, wherein the plurality of tubes includes at least five tubes.*

*28. The lamp of claim 20, wherein the plurality of tubes includes at least five columns of tubes.*

*29. The lamp of claim 20, wherein an interior surface of at least one of the plurality of tubes is absorptive.*

*30. The lamp of claim 20 wherein the light has reduced output at wavelengths that cure adhesives or composites.*

*31. A dental examination lamp comprising:*

*a housing;*

*a plurality of stray light tubes within the housing, each of the plurality of stray light tubes adapted to reduce emission of stray light rays outside a target footprint;*

*a plurality of light emitting diodes (LEDs), at least one LED for each stray light tube, wherein the plurality of stray light tubes is arranged in a generally side-by-side configuration;*

*an attachment structure disposed on the housing; and*

*a suspension structure connected to the attachment structure and arranged to suspend the lamp in a dental operatory.*

*32. The lamp of claim 31, wherein at least one of the stray light tubes comprises an absorptive or generally non-reflective interior surface.*

*33. The lamp of claim 31, further comprising a collimating element arranged to collimate light emanating from at least one of the plurality of LEDs.*

*34. The lamp of claim 31, wherein the plurality of stray light tubes are positioned with their longitudinal axes aligned toward predetermined points to direct the light from the plurality of LEDs out of the lamp to form a predetermined light pattern within an examination area.*

*35. The lamp of claim 31, further comprising a plurality of lenses, each located at an end of a stray light tube, the plurality of lenses adapted to direct the light from the plurality of LEDs out of the lamp in a predetermined pattern that casts illumination over an examination area.*

*36. The lamp of claim 35, wherein the plurality of stray light tubes and the plurality of lenses form a plurality of assemblies, each assembly adapted to direct light passing through the assembly.*

*37. The lamp of claim 31, further comprising a lens adapted to color light emanating from at least one of the plurality of LEDs.*

*38. The lamp of claim 31, wherein an interior surface of at least one of the plurality of stray light tubes is black.*

*39. The lamp of claim 31, wherein the plurality of stray light tubes includes at least five tubes.*

*40. The lamp of claim 31, wherein the plurality of stray light tubes includes at least five columns of tubes.*

*41. A dental examination lamp, comprising:*

*a housing;*

*a plurality of tubes mechanically coupled to the housing and arranged in a generally side-by-side configuration, each tube having an interior, a first end, and a second end, the second end of each tube being open to transmission of light from the interior of the tube, each tube being optically absorptive, generally non-reflective, or both optically absorptive and generally non-reflective;*

*a plurality of light emitting diodes (LEDs), each of the LEDs being arranged to direct light through at least part of one of the tubes and out of a front of the lamp;*

*an attachment structure disposed on the housing; and*

*a suspension structure connected to the attachment structure and arranged to suspend the lamp in a dental operatory.*

*42. The lamp of claim 41, further comprising a lens adapted to color light emanating from at least one of the plurality of LEDs.*

*43. The lamp of claim 41, wherein an interior surface of at least one of the plurality of tubes is black.*

*44. The lamp of claim 41, wherein the plurality of tubes includes at least five tubes.*

*45. The lamp of claim 41, wherein the plurality of tubes includes at least five columns of tubes.*

*46. A method of illuminating a dental operating area, the method comprising:*

*providing a dental operatory lamp, the dental operatory lamp including*

*a plurality of stray light tubes adapted to reduce emission of stray light rays outside a target footprint, the plurality of tubes arranged in a generally side-by-side configuration, and*

*at least one light emitting diode (LED) arranged to direct light through each stray light tube and out of the lamp;*

*providing an attachment structure disposed on the lamp;*

*providing a suspension structure connected to the attachment structure;*

*by the suspension structure, suspending the lamp in a dental operatory*

*generating light via each of the at least one LEDs; and illuminating a patient's mouth with the light.*

*47. The method of claim 46 wherein providing the dental operatory lamp comprises providing a plurality of stray light tubes with an absorptive surface.*

*48. The method of claim 46, further comprising providing a collimating element to collimate light emanating from at least one of the plurality of LEDs.*

*49. The method of claim 46, further comprising providing the plurality of stray light tubes with their longitudinal axes aligned toward predetermined points to direct the light from the plurality of LEDs out of the lamp to form a predetermined light pattern within an examination area.*

*50. The method of claim 46, further comprising providing a plurality of lenses, each at an end of a stray light tube, the plurality of lenses adapted to direct the light from the plurality of LEDs out of the lamp in a predetermined pattern that casts illumination over an examination area.*

*51. The method of claim 50, further comprising providing a plurality of assemblies from the plurality of tubes and the plurality of lenses and dispersing light passing through each assembly.*

*52. The method of claim 46, further comprising modifying a color of light emanating from at least one of the plurality of LEDs via a lens.*

*53. The method of claim 46, wherein each of the plurality of tubes has an interior surface and the interior surface of at least one of the plurality of tubes is black.*

*54. The method of claim 46, wherein the plurality of tubes includes at least five tubes.*

*55. The method of claim 46, wherein the plurality of tubes includes at least five columns of tubes.*

*56. The method of claim 46 wherein providing the dental operatory lamp comprises providing a plurality of stray light tubes with a generally non-reflective surface.*

*57. The method of claim 46 wherein illuminating a patient's mouth comprises aiming the light at the patient's mouth while reducing stray light entering the patient's eyes.*

*58. The method of claim 46 wherein the illuminating step comprises illuminating the patient's mouth with light having reduced output at wavelengths that cure adhesives or composites.*

*59. The method of claim 46 wherein the illuminating step comprises selecting from a plurality of light spectra a light spectrum with reduced output at wavelengths that cure adhesives or composites.*

* * * * *